(12) United States Patent
Denney

(10) Patent No.: US 9,386,095 B2
(45) Date of Patent: Jul. 5, 2016

(54) MULTICAST INITIAL MAINTENANCE REGIONS FOR CABLE MODEMS IN LOW POWER MODE

(71) Applicant: Broadcom Corporation, Irvine, CA (US)

(72) Inventor: Lisa Denney, Suwanee, GA (US)

(73) Assignee: Broadcom Corporation, Irvine, CA (US)

( * ) Notice: Subject to any disclaimer, the term of this patent is extended or adjusted under 35 U.S.C. 154(b) by 232 days.

(21) Appl. No.: 13/871,483

(22) Filed: Apr. 26, 2013

(65) Prior Publication Data

US 2014/0321463 A1    Oct. 30, 2014

(51) Int. Cl.
*H04L 12/28* (2006.01)
*H04L 29/08* (2006.01)
*H04L 5/00* (2006.01)
*H04W 52/02* (2009.01)

(52) U.S. Cl.
CPC .......... *H04L 67/1095* (2013.01); *H04L 5/0078* (2013.01); *H04W 52/0219* (2013.01); *H04W 52/0229* (2013.01); *H04W 52/0296* (2013.01)

(58) Field of Classification Search
None
See application file for complete search history.

(56) References Cited

U.S. PATENT DOCUMENTS

| 2009/0094381 A1* | 4/2009 | King et al. ................... 709/240 |
| 2009/0232111 A1* | 9/2009 | Li et al. ........................ 370/337 |
| 2013/0036318 A1* | 2/2013 | Reams ......................... 713/322 |

OTHER PUBLICATIONS

*Data-Over-Cable Service Interface Specifications, DOCSIS 3.0, MAC and Upper Layer Protocols Interface Specification*, CM-SP-MULPIv3.0-I16-110623, 768 pages, Copyright 2006-2011, Cable Television Laboratories, Inc.

* cited by examiner

*Primary Examiner* — Feben M Haile

(74) *Attorney, Agent, or Firm* — Sterne, Kessler, Goldstein & Fox PLLC

(57) ABSTRACT

A method in a cable modem (CM) to adjust its timing offset when waking up prior to the termination of its sleep cycle is provided. The method includes the step of receiving a service identifier (SID) for a multicast maintenance region, receiving a message from a cable modem termination system (CMTS) to enter a sleep cycle, waking up from the sleep cycle before the end of the sleep cycle in response to an event, and sending a message to the cable modem termination system (CMTS) to adjust the CM's timing offset during the multicast maintenance region.

20 Claims, 10 Drawing Sheets

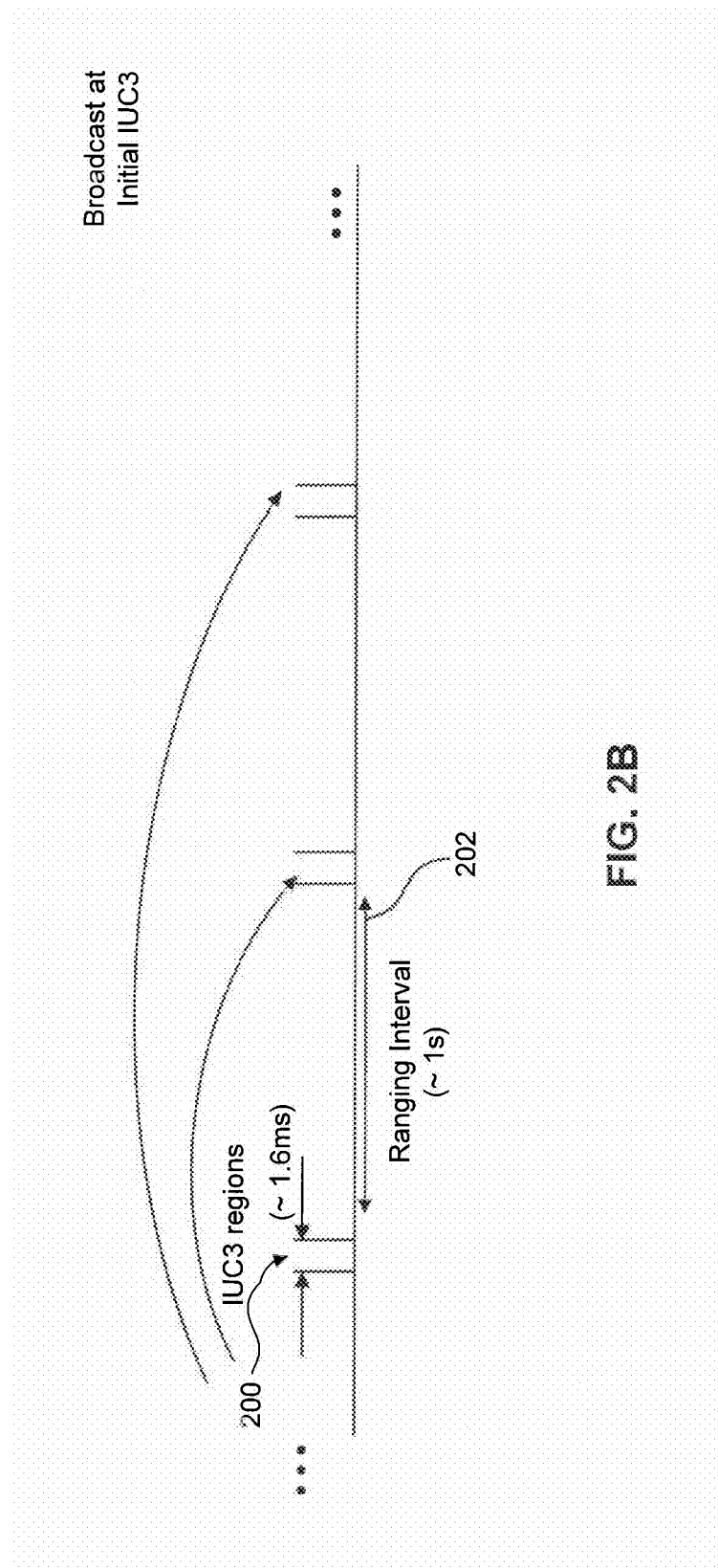

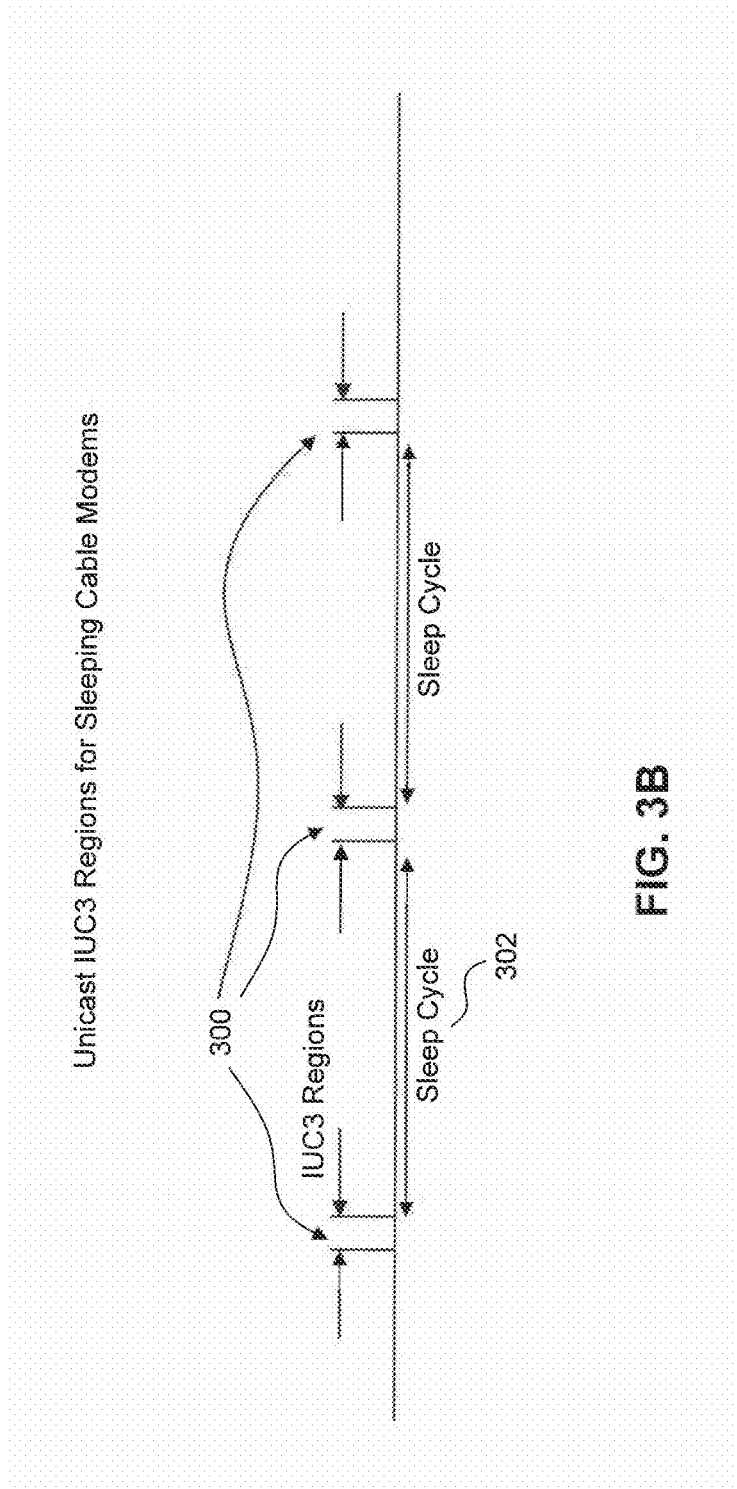

MULTICAST INITIAL MAINTENANCE REGIONS FOR CABLE MODEMS IN LOW POWER MODE

CROSS-REFERENCE TO RELATED APPLICATIONS

This application claims the benefit of U.S. Provisional Application No. 61/641,752, filed May 2, 2012, which is incorporated herein by reference in its entirety.

BACKGROUND OF THE INVENTION

1. Field of the Invention

This application generally relates to multicast initial maintenance regions for cable modems in low power mode.

2. Background Art

Cable television (CATV) systems are no longer limited to only providing television programs to viewers. In addition, CATV systems provide internet access, and/or other services to consumers via signals transmitted to customer premises by optical fibers, coaxial and other cables, such as Wi-Fi, Bluetooth®, etc., all in contrast to traditional over-the-air radio wave broadcasting of television programming.

The CATV system may utilize Data Over Cable Service Interface Specification (DOCSIS) compliant equipment and protocols to carry out a transfer of information, such as video, audio, and/or data between one or more set-top devices and one or more cable modem termination systems (CMTS). The DOCSIS Specification generally refers to a group of specifications published by CableLabs® that define industry standards for CMTS, cable modems (CMs) and control for set-top devices. In part, the DOCSIS specification sets forth requirements and objectives for various aspects of cable modem systems including, but not limited to, operations support systems, management, data interfaces, network layer, data link layer, and physical layer transport for data over cable systems. The DOCSIS interface specification entitled "Data-Over-Cable Service Interface Specifications, DOCSIS 3.0, MAC and Upper Layer Protocols Interface Specification, CM-SP-MULPIv3.0-I16-110623" is incorporated by reference herein in its entirety.

A DOCSIS cable system includes two primary components: one or more cable modems at a customer premises, and a CMTS located at a headend. As used herein, the term "downstream" refers to the transfer of information in a direction from the CMTS to the cable modems. The term "upstream" refers to the transfer of information in a direction from cable modems to the CMTS.

A CMTS may periodically put a CM in a "sleep mode" for power saving reasons. The sleep mode is also referred to as a "low power mode." When the CM wakes up at the end of its pre-determined periodic sleep cycle, it has to adjust its timing offset so that its upstream transmissions are aligned to the correct mini-slot boundary assigned by a CMTS. However, if the CM wakes up before the end of its sleep cycle due to an event, there is no mechanism available to quickly allow the CM to reacquire its timing by adjusting its timing offset.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 2B illustrates an example of IUC3 regions used by CMs for initial ranging.

FIG. 3B illustrates example IUC4 regions that are separated in time by a sleep cycle.

The present invention will now be described with reference to the accompanying drawings. In the drawings, like reference numbers may indicate identical or functionally similar elements.

DETAILED DESCRIPTION OF THE INVENTION

While the present invention is described herein with reference to illustrative embodiments for particular applications, it should be understood that the disclosure is not limited thereto. Those skilled in the art with access to the teachings provided herein will recognize additional modifications, applications, and embodiments within the scope thereof and additional fields in which the disclosure would be of significant utility.

Figure 1:
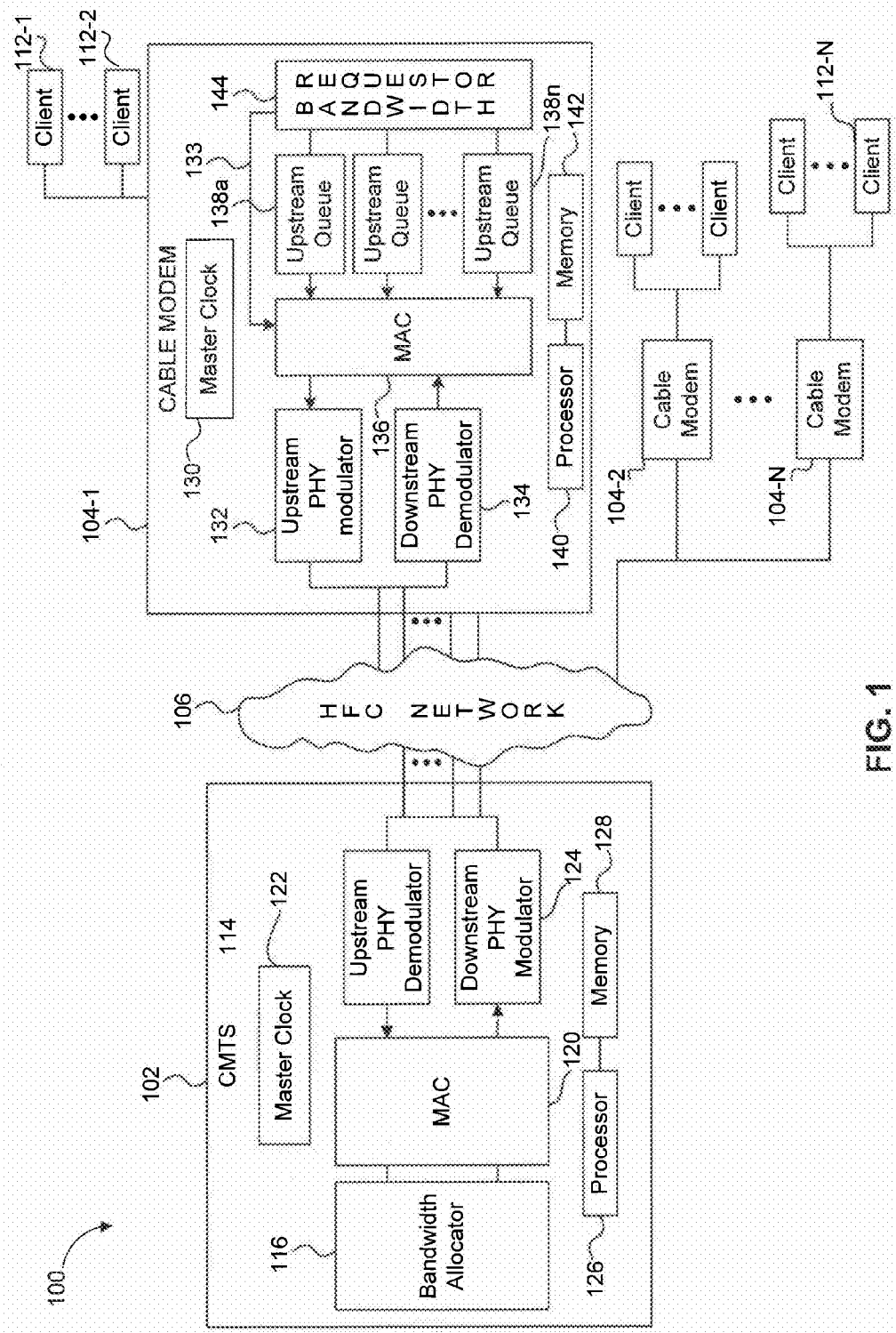
FIG. 1 illustrates an example communication system according to an embodiment of the disclosure.

FIG. 1 illustrates an example communication system 100 according to an embodiment of the disclosure. System 100 includes a headend or cable modem termination system 102 coupled to one or more cable modems 104-1 to 104-N via HFC network 106. Each cable modem 104 may be connected or coupled to one or more client devices 112a-n. For ease of illustration, cable modem 104-1 is shown in greater detail than the other cable modems. All cable modems 104-1 through 104-N have essentially the same construction.

A cable modem 104 may include a master clock 130, an upstream physical layer modulator (US PHY) 132, and a downstream physical layer demodulator (DS PHY) 134. The US PHY 132 and the DS PHY 134 are coupled to Media Access Control (MAC) 136. MAC 136 is coupled to upstream queues 138a-138n. Upstream queues 138 store data for upstream transmission to CMTS 102. Bandwidth requestor 144 is coupled to upstream queues 138. Cable modem 104 also includes a processor 140 coupled to a memory 142. The functions described herein as performed by cable modem 104 may be performed by processor 140 based on instructions stored in memory 142. Cable modem 104 is coupled to HFC network 106 using coaxial cable. While the embodiments described herein utilize a HFC network and coaxial cable, other methods of transmission may include, but are not limited to, wired, wireless, or both transmission media, including satellite, terrestrial (e.g., fiber optic, copper, twisted pair, coaxial, hybrid fiber-coaxial (HFC), or the like), radio, microwave, free-space optics, and/or any other form or method of transmission.

US PHY 132 forms the physical layer interface between a cable modem 104 and the upstream channels of HFC network 106. Cable modem 104 may include a separate US PHY 132 for each one of the upstream channels. Video, voice, data and/or control messages that are destined for CMTS 102 are collected at US PHY 132 and transmitted to CMTS 102. US PHY 132 modulates and/or formats the information for upstream transmission to CMTS 102

DS PHY 134 forms the physical layer interface between cable modem 104 and the downstream channel(s) of HFC network 106. DS PHY 134 receives and demodulates all bursts from CMTS 102.

The frequency spectrum available for use by the system 100 for communication may be partitioned into "channels." As used herein, the term "downstream channels" refers to the channels over which data is transferred from the CMTS 102 to the cable modems 104. The term "upstream channels" refers to the channels over which data is transferred from the cable modems 104 to the CMTS 102.

MAC 136 receives downstream signals from DS PHY 134 and provides upstream signals to US PHY 132, as appropriate. MAC 136 operates as the lower sublayer of the data link layer for cable modem 104. MAC 136 may support fragmentation, concatenation, payload header suppression/expansion, and/or error checking for signals transported over the physical layer.

Memory 142 may interact with MAC 136 to store the signals as they are processed by MAC 136. Memory 142 may also store various auxiliary data used to support the processing activities. Such auxiliary data includes security protocols, identifiers, rules, policies etc.

Bandwidth requestor 144 requests bandwidth from CMTS 102 based on an amount of data in upstream queues 138, a Quality of Service (QoS) for upstream flows and a service level agreement (SLA) for a client 112. QoS comprises requirements on aspects of a connection between a cable modem 104 and CMTS 102, such as service response time, loss, signal-to-noise ratio, cross-talk, echo, interrupts, frequency response, loudness levels etc. The SLA may specify the levels of availability, serviceability, performance, operation, or other attributes of a service provided by CMTS 102 to a cable modem 104, such as billing. In an example, bandwidth requestor 144 generates a signal 133 that indicates a queue depth of a queue 138 to MAC 136. The queue depth indicates an amount of data in an upstream queue 138 for transmission to CMTS 102. MAC 136 prepares a request for bandwidth based on the queue depth.

Cable modem termination system (CMTS) 102 includes a master clock 114, an upstream PHY demodulator 122, a downstream PHY modulator 124 and a MAC 120. MAC 120 is coupled to a bandwidth allocator 116. CMTS 102 also includes a processor 126 coupled to a memory 128. According to an embodiment of the disclosure, the functions described herein as performed by CMTS 102 may be performed by processor 126 based on instructions stored in memory 128.

CMTS 102 is also coupled to cable modems 104 via HFC network 106.

US PHY 122 forms the physical layer interface between CMTS 102 and the upstream channels of HFC network 106. CMTS 102 may include a separate US PHY 122 for each one of the upstream channels. US PHY 122 receives and demodulates all bursts from cable modems 104.

DS PHY 124 forms the physical layer interface between CMTS 102 and the downstream channel(s) of HFC network 106. Video, voice, data and/or control messages that are destined for one or more cable modems 104 are collected at DS PHY 124 and transmitted to the respective cable modems 104. DS PHY 124 modulates and/or formats the information for downstream transmission.

MAC 120 receives the upstream signals from US PHY 122 and provides the downstream signals to DS PHY 124, as appropriate. MAC 120 operates as the lower sublayer of the data link layer of CMTS 102. MAC 120 may support fragmentation, concatenation, payload header suppression/expansion, and/or error checking for signals transported over the physical layer.

Memory 128 may interact with MAC 120 to store the signals as they are processed by MAC 120. Memory 128 may also store various auxiliary data used to support the processing activities. Such auxiliary data includes security protocols, identifiers, rules, policies etc.

Bandwidth allocator 116 may allocate bandwidth to a cable modem 104 based on the bandwidth request generated by bandwidth requestor 144 of a cable modem 104. In an example, as will be described further below, bandwidth allocator 116 may also store a state for upstream channels of a cable modem 104. The bandwidth allocator 116 grants bandwidth in the form of a "grant" which is a MAP message that comes in on downstream channels via DS PHY 124.

In an example, a client 112 may be any wired or wireless device including but not limited to a personal computer, a laptop computer, a cellphone, personal digital assistant (PDA) or a media player such as an iPod™ or iPad™.

When a CM 104 first connects to a CMTS 102, e.g. during startup, it doesn't know the propagation delay for transmissions to the CMTS 102 because neither the CMTS 102 nor the CM 104 know how far physically the CM 104 is from the CMTS 102. DOCSIS defines an Initial Maintenance Region known as Interval Usage Code 3 (IUC3). This region is designed to allow a CM 104 to initially range on a DOCSIS upstream channel so that the CM 104 can acquire a timing offset based on its round-trip propagation delay to the CMTS 102. "Ranging" is the process of acquiring the correct timing offset such that a CM's transmissions are aligned to the correct mini-slot boundary assigned by a CMTS via a MAP message. "Initial Ranging" occurs when the CM 104 first tries to connect to CMTS 102. It is to be appreciated that broadcast, unicast, or multicast IUC3 or IUC4 regions referred to herein may alternatively be referred to as "transmission opportunities" or "ranging opportunities."

For initial ranging purposes, the CMTS 102 assigns the IUC3 region to a broadcast Service Identifier (SID), e.g. 0x3FFF. Since every CM 104 receives the broadcast SID, every CM 104 can use the broadcast IUC3 region for ranging when first connecting to the CMTS 102. The IUC3 region is assigned in MAP messages from the CMTS 102 and is comparatively large in size, typically 1.6 milliseconds in duration. The duration is selected to account for the propagation delay differences between a CM 104 that is physically very close to the CMTS 102 and a CM 104 that is physically very far away from the CMTS 102.

Figure 2A:
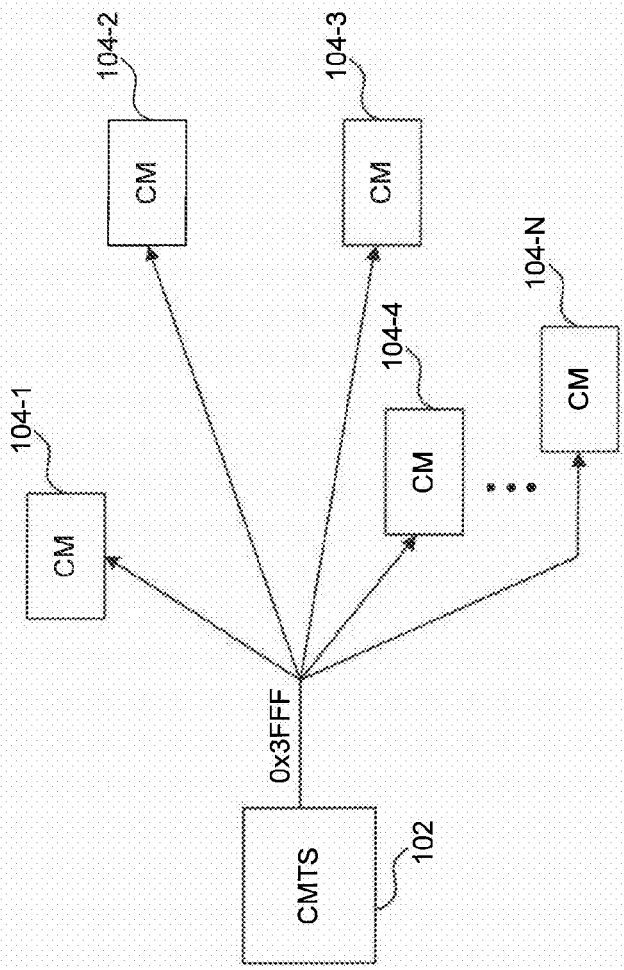
FIG. 2A illustrates an example of broadcast assignment of a SID for IUC3 regions for initial ranging of cable modems.

FIG. 2A illustrates an example of broadcast assignment of a SID for IUC3 regions for initial ranging of cable modems.

In a broadcast transmission, the CMTS 102 broadcasts the same message to every CM 104 in the network. In the example in FIG. 2A, CMTS 102 transmits the broadcast SID to every CM 104 for initial ranging of the CM 104. For example, the CMTS may broadcast a SID 0x3FFF to each of the cable modems 104. This SID authorizes any of the CMs 104 to use the IUC3 regions illustrated in FIG. 2B for initial ranging.

FIG. 2B illustrates an example of IUC3 regions 200 used by CMs 104 for initial ranging.

In the example in FIG. 2B, IUC3 regions 200 are separated in time by a "ranging interval" 202. Ranging interval 202 is the time between IUC3 regions 200. These IUC3 regions are also known as "broadcast IUC3 regions" because the SID associated with them applies to every CM 104. IUC3 regions 200 can be used by any cable modem 104 for initial ranging.

IUC3 regions 200 are typically not allocated frequently. For example, a typical ranging interval 202 is approximately one second. There is a "contention back off" process if multiple CMs 104 are trying to range simultaneously during the same IUC3 region 200. In the contention back off process, if there is contention when multiple CMs 104 are trying to range simultaneously, then the CMs 104 have to pick a random number X and "back off" or skip the next X IUC3 regions 202 and try ranging again in the X+1 IUC3 region 200. For example, if a CM picks four, then it has wait for the fifth IUC3 region 200 to try and range again. If ranging is again unsuccessful, then the CM has to again pick a random number and the next opportunity to range in an IUC3 region 200 might be even further away.

One solution may be to allocate more IUC3 regions 200 and/or to shorten ranging interval 202. The delays in ranging associated with the contention back off process are acceptable for initial ranging of a CM 104 when it connects to CMTS 104. However, CMTS 102 may put a CM 104 to "sleep" due to inactivity of the CM 104. Alternatively the CM 104 may put itself to sleep as part of a regularly scheduled sleep cycle or due to prolonged inactivity. When a CM 104 is put to sleep its circuits including a clock recovery circuit, are powered down. When a CM 104 is sleeping it is also referred to as in "sleep mode" or "low power mode." For a sleeping CM 104, much faster ranging may be required if it wakes before its pre-determined sleep cycle is over. The "sleep cycle" is the pre-determined duration for a CM 104 to sleep before it "wakes up." During "wake up" a CM 104 powers up circuits including any clock recovery circuits. A "wake cycle" of CM 104 is a time period during which the CM 104 is not in a sleep cycle or a low power mode.

After a CM 104 that has been initially ranged goes to sleep and then wakes up, its timing offset needs to be adjusted because it has to recover clock timing from a downstream channel of the CMTS 102. The timing offset needs to be adjusted due to internal processing/propagation delays in the filters and clock recovery circuits of the CM 104. The shift in the timing offset that was acquired during the initial ranging could be in microseconds but is important enough for the CM 104 to re-adjust before it transmits data upstream to the CMTS 102. For adjusting the timing offset, the CM 104 doesn't need the relatively large IUC3 region 200. The relatively large IUC3 region 200, which is typically 1.6 ms, is required for the uncertainty in the distance of the CM 104 from the CMTS 102 and for transmission of a burst ranging packet.

In conventional systems, when a CM wakes up at a pre-determined time from a regularly scheduled sleep cycle and its propagation delay and timing offset are known from its initial ranging, the CMTS 102 has several options in the type of maintenance region it can provide for adjusting the timing offset of the CM that is waking up. The CMTS may use a station maintenance region known as IUC4 to make fine timing adjustments to the timing offset. The size of the IUC4 region is fixed when the CMTS is initialized. The CMTS also uses the IUC4 region for periodic ranging to ensure the CM's timing remains within the required tolerances for transmitting upstream data. The CMTS may alternatively use a unicast IUC3 region that is smaller than the usual broadcast IUC3 region. The CMTS will use a unicast IUC3 region if the potential timing ambiguity of the timing offset is larger than can be handled with a standard IUC4 region. The unicast IUC3 region allows the CMTS to send a ranging opportunity during the CMs regular wake cycle and adjust timing that would be outside the normal IUC4 region.

Figure 3A:
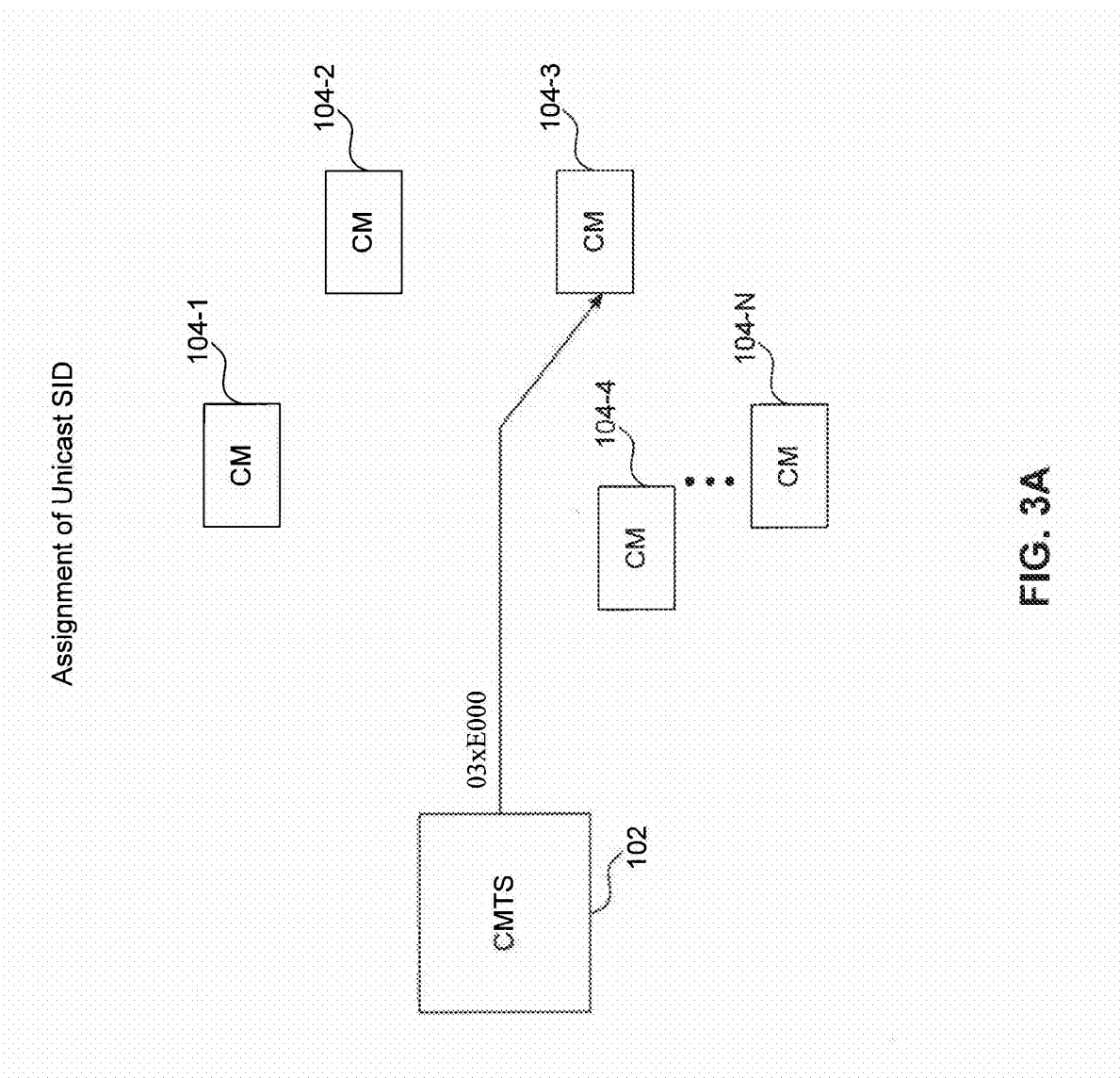
FIG. 3A illustrates an example of unicast assignment of SIDs for IUC4 regions for cable modems waking up from a regularly scheduled sleep cycle.

FIG. 3A illustrates an example of unicast assignment of SIDs for IUC3 regions for cable modems waking up from a regularly scheduled sleep cycle.

In the example in FIG. 3A, CMTS 102 assigns a dedicated IUC3 region to a CM, e.g. CM 104-3, by using a unicast SID, e.g. 03xE000, to CM 104-3. A unicast SID is unique to only a single CM 104 and bandwidth is allocated to that CM 104 as opposed to allocation to a broadcast SID where those bandwidth allocations can be used by all CMs 104.

FIG. 3B illustrates example unicast IUC3 regions 300 that are separated in time by sleep cycle 302.

In the example in FIG. 3B, the CMTS 102 may determine the length of the sleep cycle 302. Since the CMTS 102 knows exactly when a CM 104 will wake up, it can adjust sleep cycle 302 such that the unicast IUC3 region 300 coincides with a time at which the CM 102 will wake up. Unicast IUC3 regions 300 are small when compared to broadcast IUC3 regions 200 because a CM 102 that has been previously ranged only requires small adjustments to its timing offset.

The above method of using unicast IUC3 regions for small adjustments to timing offsets of a CM 104 works well for cases where a CM 104 can wait to transmit until it wakes up. However, if a CM 104 needs to wake up prior to the termination of its sleep cycle 302 and transmit a message urgently, that CM 104 needs to be able to wake up, adjust its timing offset, and transmit to the CMTS 102. One way to accomplish this is to allow the CM 104 to use the broadcast IUC3 regions 200 that are allocated by the CMTS 102 several times a second. However, as described above, this method results in contention backoff delays along with wasted upstream bandwidth because of the large size of broadcast IUC3 regions 300.

To solve the problem of a CM 104 waking up before its pre-determined sleep cycle 302 is over, the inventor has created a "reduced" multicast IUC3 region (also referred to as a "multicast reduced IUC3 region" herein) that has a duration sufficient to allow a CM 102 to adjust its timing offset after waking up prior to the termination of its sleep cycle 302. Because these reduced multicast IUC3 regions are small compared to broadcast IUC3 regions 200 used for initial ranging, the CMTS 102 could allocate the multicast reduced IUC3 regions more frequently than the broadcast IUC3 regions 200 without wasting a significant amount of upstream bandwidth. CMs 104 not in a sleep cycle or those just connecting to CMTS 102 for initial ranging will ignore the multicast reduced IUC3 regions because the SID assigned to the multicast reduced IUD3 region does not match the CM's unicast ranging SID for IUC3 regions 300 or the broadcast SID assigned for IUC3 regions 200.

Figure 4A:
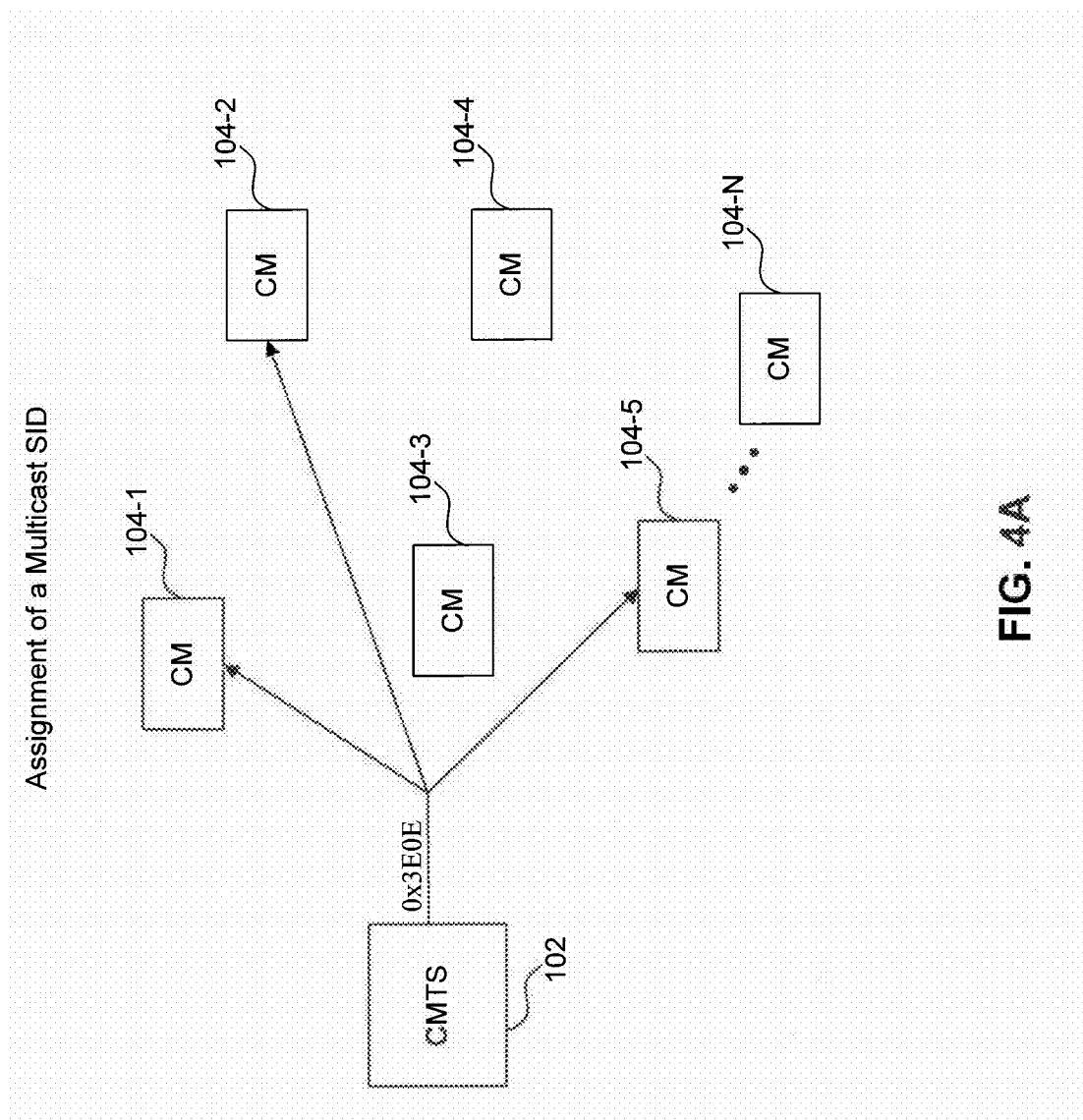
FIG. 4A illustrates an example of multicast assignment of SIDs for multicast reduced IUC3 regions to CMs.

FIG. 4A illustrates an example of multicast assignment of SIDs for multicast reduced IUC3 regions to CMs 104.

In the example in FIG. 4A, CMTS 104 assigns a group of CMs 104 a SID that can be used only by CMs in that group for adjusting their timing offsets during a multicast reduced IUC3 region that corresponds to the assigned SID. The multicast SID is to be used by the CMs 104 that wake up before their predetermined periodic sleep cycle 302 in response to an event. In an example, the event may be a loss of A/C power and use of backup battery power, a Wake On LAN (WOL) event, or an interrupt. The WOL event wakes up a CM 104 in response to receiving a message over a local network.

In FIG. 4A, cable modems 104-1, 104-2 and 104-5 are part of a group that may be assigned a SID 0x3E0E during bandwidth allocations by CMTS 102. Assignment of bandwidth to SID 0x3E0E allows any number of CMs 104 with multicast SID 0x3E0E to transmit in the transmit opportunity associated with SID 0x3E0E. Assignment of bandwidth by CMTS 102 to a broadcast SID allows all CMs 104 to use that transmit opportunity. Assignment of bandwidth to a unicast SID by CMTS 102 allows only the single CM 104 with that provisioned unicast SID to transmit during the transmit opportunity. In this example, the multicast SID 0x3E0E can be used only by CMs 104-1, 104-2, and 104-5 for adjusting their timing offsets during a multicast reduced IUC3 region that corresponds to SID 0x3E0E. In this example, by reducing the number of CMs 104 that can use a particular reduced IUC3 region, the amount of contention back off time period when trying to use a reduced IUC3 region is reduced. The CMTS 102 may assign a different SID, e.g. 0x3E0F, to a second group of CMs, e.g. CM 104-3, 104-4, and 104-N, that corresponds to a second multicast reduced IUC3 region. Additionally, because the multicast IUC3 regions 400 can be made very small in duration because the CMs 104 using this region have previously been ranged, the CMTS 102 can allocate many more reduced multicast IUC3 regions 400 while consuming only a small fraction of the bandwidth used by a broadcast IUC3 200.

For the case of a sleeping CM 104 that needs to wake on an event local to the CM prior to the end of sleep cycle 302, the CM 104 needs the ability to range. Because the CMTS 102 does not know that the CM 104 will be waking off schedule, the CMTS 102 cannot use the unicast IUC3 region 200. The use of a reduced multicast IUC3 region 400 allows the CMTS 102 to offer a small ranging opportunity that can be used by sleeping CMs upon a local wake event that have been assigned a multicast SID corresponding to reduced multicast IUC3 regions 400.

In an example, each CM 102 supporting a sleep mode could be given a priority level in the SID assigned for a multicast reduced IUC3 region. The CM 102 would then look for IUC3 regions with 0x3EXX where the appropriate bit corresponding to the CM's priority level is set. For example, a CM with a priority level of 3 would look for the bit 3 in the "XX" portion of its SID to be set. Using this scheme, the CMTS 102 could divide sleeping CMs 104 and the SID assignment for the multicast IUC3 region. The CM's would still use the same contention backoff mechanism described previously.

Figure 4B:
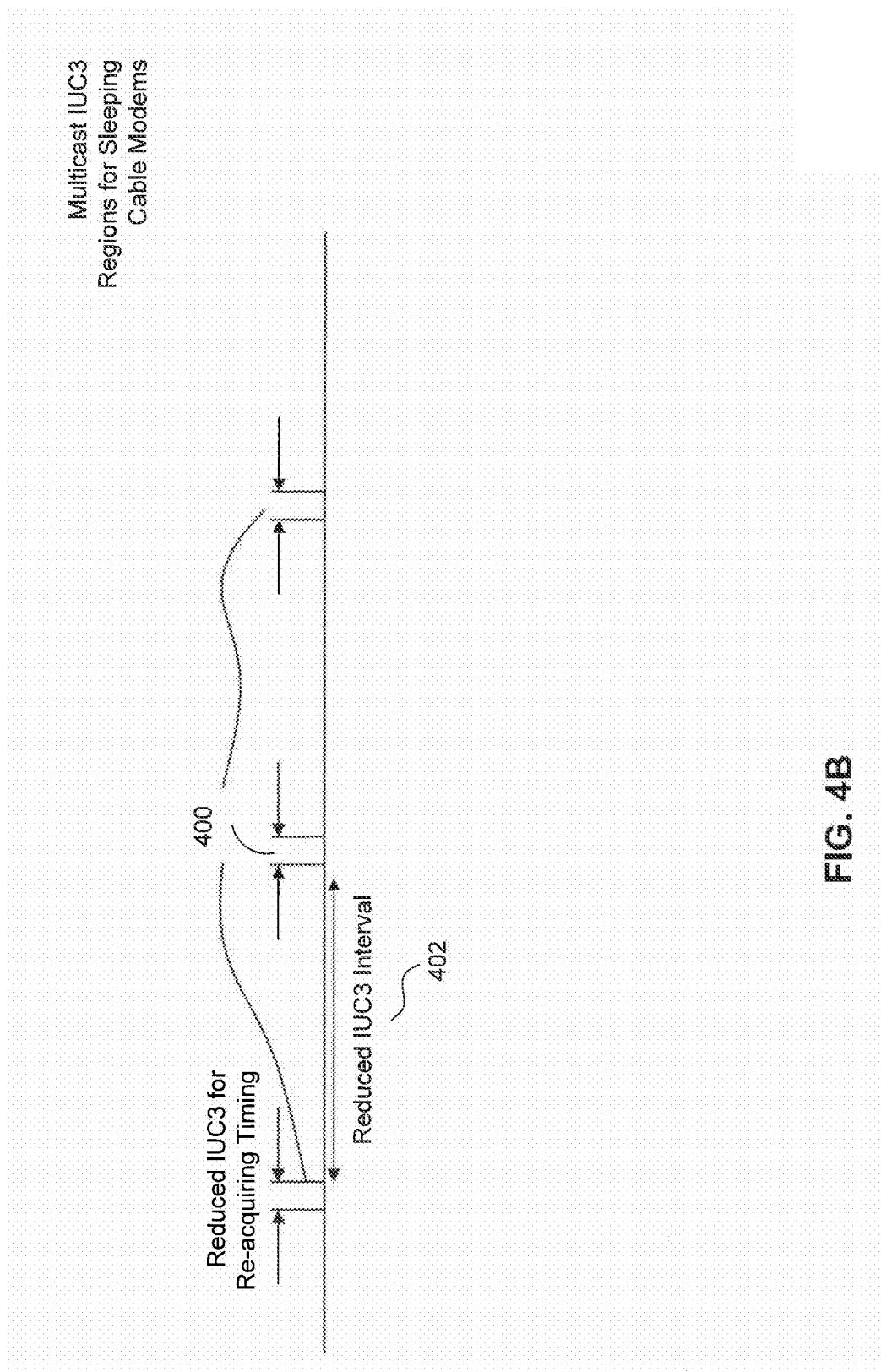
FIG. 4B illustrates an example of multicast reduced IUC3 regions.

FIG. 4B illustrates an example of multicast reduced IUC3 regions 400. The multicast reduced IUC3 regions 400 are separated in time by reduced IUC3 interval 402. According to an embodiment, multicast reduced IUC3 regions 400 are smaller in size than broadcast IUC3 regions 200. Multicast reduced IUC3 regions 400 are smaller in size because a sleeping CM 104 does not require a substantial amount of time to adjust its timing offset since it was initially ranged when it first connected to CMTS 102. Furthermore, reduced IUC3 ranging interval 402 is sized to be smaller than ranging interval 202 because CMTS 102 does not know when a cable modem 104 may wake up before its periodically scheduled wake up cycle 302. Reduced IUC3 regions 400 are used by CMs 104 waking up before the end of their sleep cycle 302

A CM 104 typically wakes up prior to the termination of their pre-determined sleep cycle 302 in response to an event. Since it is unlikely that multiple CMs 104 will wakeup before the termination their pre-determined sleep cycle 302 at the same time, there will be less of a likelihood of contention backoff during a multicast reduced IUC3 region 400. In one example, CMs 104 using multicast reduced IUC3 regions 400 use the same contention backoff algorithm defined for broadcast IUC3 regions 300 using start and end backoff windows from a MAP message that was originally transmitted by CMTS 102 to CMs 104 for initial ranging using broadcast IUC3 regions 300. The "MAP" message provides each CM 104 with a time slot when they can transmit their data as well as when there are available time slots to transmit bandwidth requests and maintenance message. In another example, CMs 104 using multicast reduced IUC3 regions 400 use a new backoff window communicated downstream by CMTS 102 before the start of their sleep cycle 302. The latter option allows the CMTS 102 to use different backoff windows for new CMs 104 initially ranging as compared to CMs 104 suddenly waking prior to the termination of their sleep cycle 302.

In an example, CMs 104 that wakeup at the end of their predetermined sleep cycle 302 continue to use unicast IUC3 regions 300 to adjust their timing offset. CMs 104 that need to wake before the end of their predetermined sleep cycle 302 use the multicast reduced IUC3 regions 400 to adjust their timing offsets.

Figure 5:
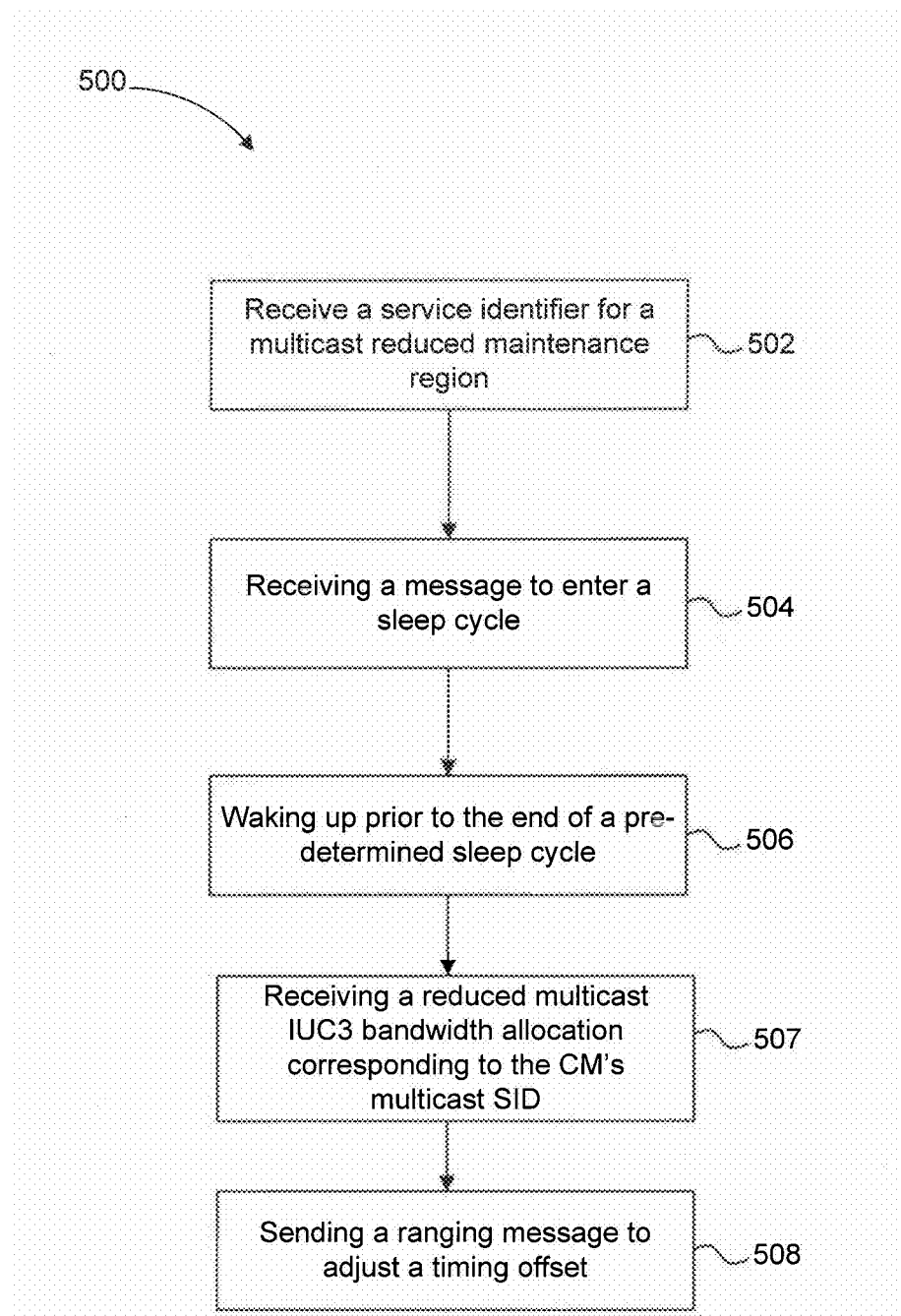
FIG. 5 illustrates an example flowchart illustrating steps performed by a cable modem to adjust its timing offset.

FIG. 5 illustrates an example flowchart 500 illustrating steps performed by a cable modem to adjust its offset. Flowchart 500 will be described with continued reference to the example operating environment depicted in FIGS. 1-4. However, the process is not limited to these embodiments. Note that some steps shown in flowchart 500 do not necessarily have to occur in the order shown. In an example, the steps are performed by processor 140 based on instructions stored in memory 142.

In step 502, a cable modem receives a SID for a multicast reduced IUC3 region. For example, a CM 104-1 receives a multicast SID from CMTS 102 that indicates the SID the CM should look for when receiving bandwidth allocations to the reduced IUC3 400 region that can be used by CM 104-1 to adjust its timing offset.

In step 504, the cable modem receives a message to go to sleep for the duration of a sleep cycle. For example, cable modem 104-1 receives a message from the CMTS 102 to go to sleep for the duration of sleep cycle 302.

In step 506, the cable modem wakes up prior to the end of its predetermined sleep cycle. For example, cable modem 104-1 wakes up prior to the end of its predetermined sleep cycle 302 in response to an event.

In step 507, the cable modem receives bandwidth allocation for a reduced multicast IUC3 region that corresponds to the CM's multicast SID received in step 502.

In step 508, a ranging message is sent to adjust a timing offset. For example, cable modem 104-1 sends a message to CMTS 102 during a reduced IUC3 region 400 corresponding to the SID received in step 502 to adjust its timing offset.

Figure 6:
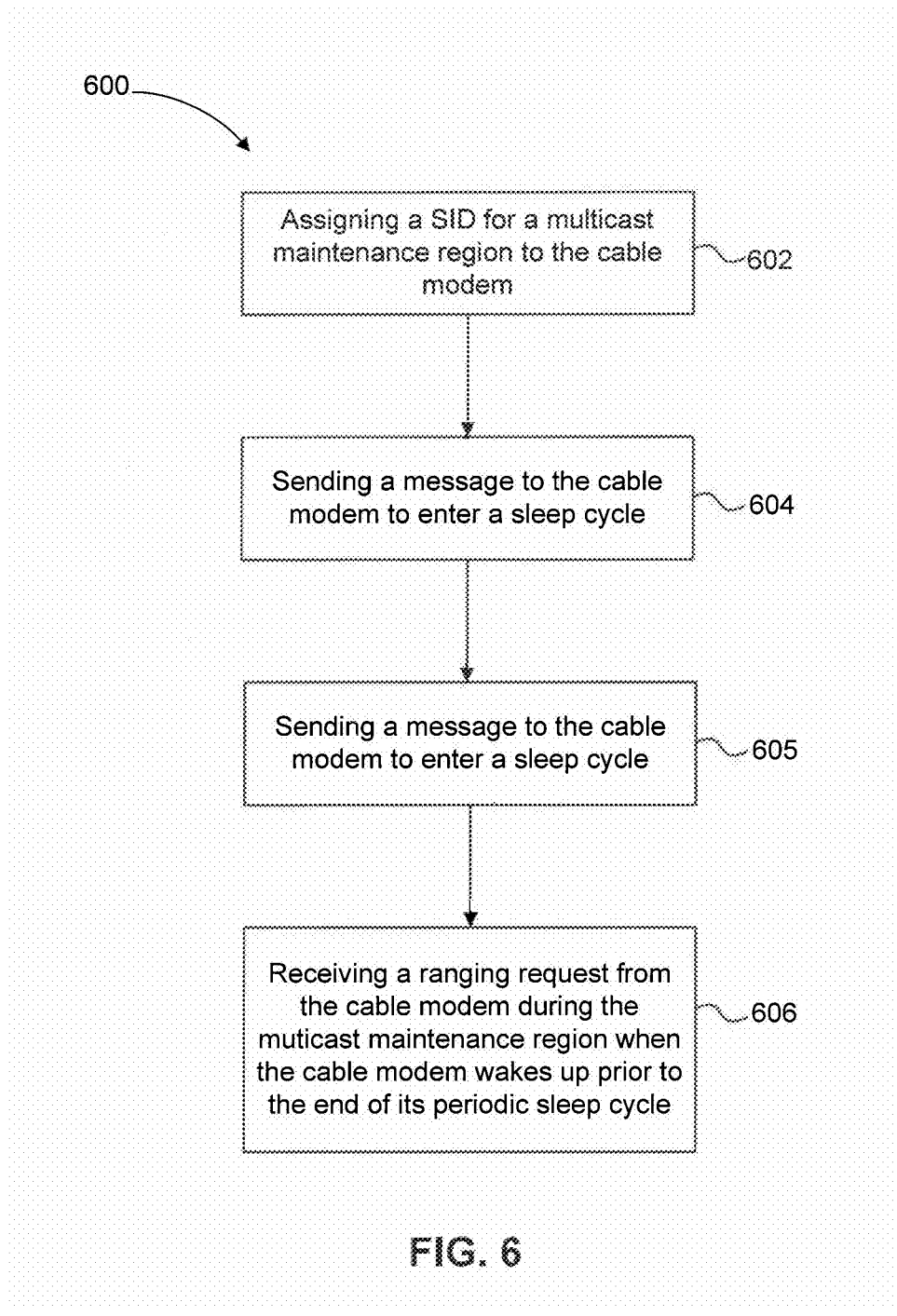
FIG. 6 illustrates an example flowchart illustrating steps performed by CMTS to assign reduced IUC3 maintenance regions for sleeping cable modems.

FIG. 6 illustrates an example flowchart 600 illustrating steps performed by CMTS to assign reduced IUC3 maintenance regions for sleeping cable modems. Flowchart 600 will be described with continued reference to the example operating environment depicted in FIGS. 1-4. However, the process is not limited to these embodiments. Note that some steps shown in flowchart 600 do not necessarily have to occur in the order shown. In an example, the steps are performed by processor 126 based on instructions stored in memory 128.

In step 602, a SID is assigned for a multicast reduced IUC3 region to a cable modem. For example, as seen in FIG. 4A, CMTS 102 assigns a SID for a multicast reduced region 400 to a cable modem 104-1.

In step 604, a message is sent to the cable modem to enter a sleep cycle. For example, CMTS 102 sends a message to the cable modem 104-1 to enter a sleep cycle.

In step 605, the CMTS provides one or more IUC3 bandwidth allocations for reduced IUC3 multicast regions 402 that correspond to the CM's multicast maintenance SID transmitted in step 602.

In step 606, a ranging request from the cable modem is received during the multicast reduced region when the cable modem wakes up prior to the end of its pre-determined sleep cycle 302. For example, if cable modem 104-1 wakes up prior to its predetermined sleep cycle 302, CMTS 102 receives a ranging request from cable modem 104-1 during a multicast reduced IUC3 region 400 that corresponds to the SID assigned to the cable modem 104-1 in step 602.

Example General Purpose Computer System

Embodiments presented herein, or portions thereof, can be implemented in hardware, firmware, software, and/or combinations thereof.

The embodiments presented herein apply to any communication system between two or more devices or within subcomponents of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 7:
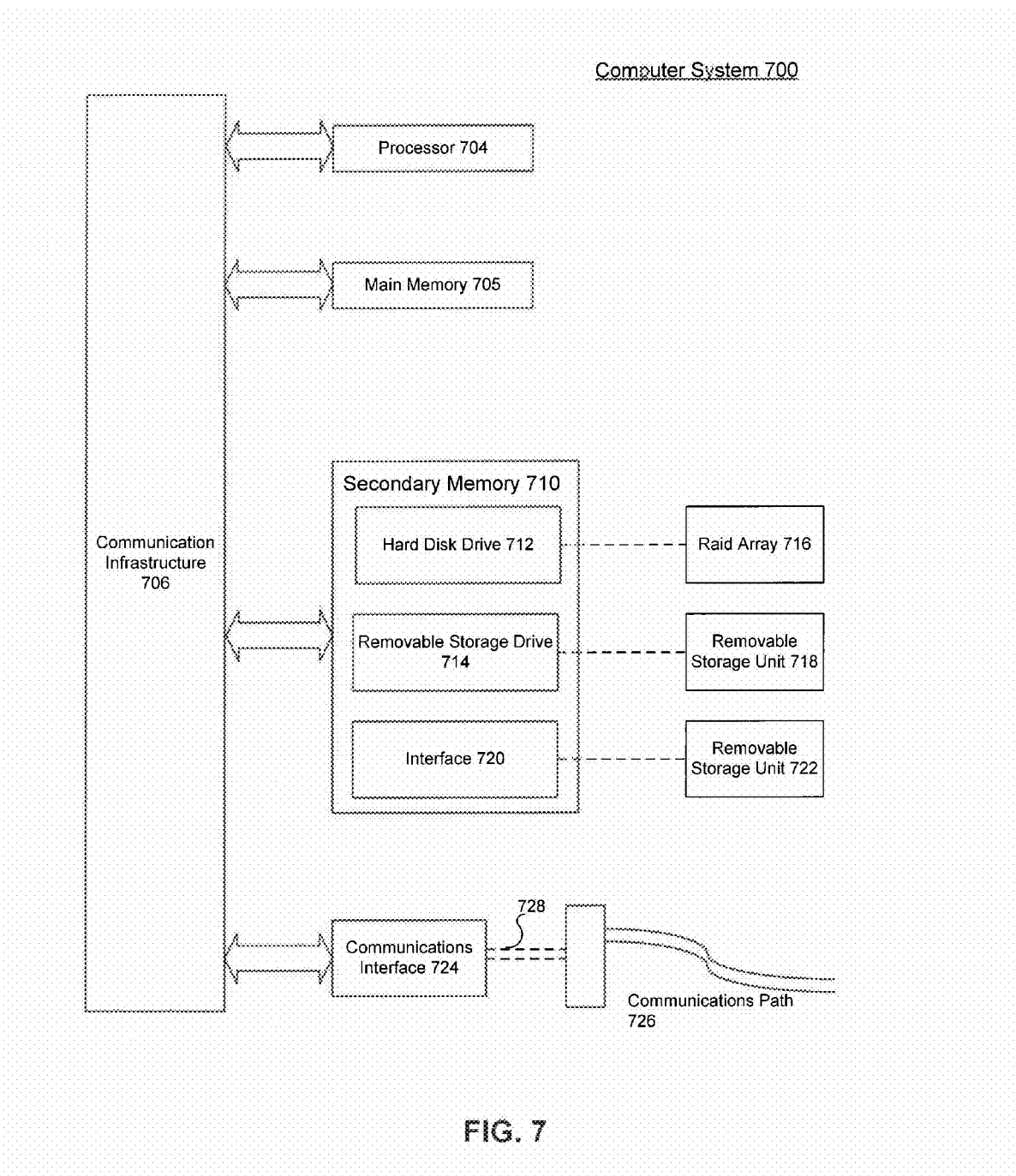
FIG. 7 is a block diagram of an exemplary computer system on which the embodiments presented herein can be implemented.

The following describes a general purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 700 is shown in FIG. 7. For example, one or more of the flowcharts and algorithms described herein can be implemented utilizing all or parts of computer system 700. The computer system 700 includes one or more processors, such as processor 704. Processor 704 can be a special purpose or a general purpose digital signal processor. The processor 704 is connected to a communication infrastructure 706 (for example, a bus or network). Various software implementations are described in terms of this exemplary computer system. After reading this description, it will become apparent to a person skilled in the relevant art how to implement the disclosure using other computer systems and/or computer architectures.

Computer system 700 also includes a main memory 705, preferably random access memory (RAM), and may also include a secondary memory 710. The secondary memory 710 may include, for example, a hard disk drive 712, and/or a RAID array 716, and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc. As will be appreciated, the removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a PCMCIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path 726. Communications path 726 carries signals 728 and may be implemented using wire or cable, fiber optics, a phone line, a cellular phone link, an RF link and other communications channels.

The terms "computer program medium" and "computer usable medium" are used herein to generally refer to media such as removable storage drive 714, a hard disk installed in hard disk drive 712, and signals 728. These computer program products are means for providing software to computer system 700.

Computer programs (also called computer control logic) are stored in main memory 705 and/or secondary memory 710. Computer programs may also be received via communications interface 724. Such computer programs, when executed, enable the computer system 700 to implement the present disclosure as discussed herein. In particular, the computer programs, when executed, enable the processor 704 to implement the processes of the present disclosure. For example, when executed, the computer programs enable processor 704 to implement part of or all of the steps described above with reference to the flowcharts herein. Where the disclosure is implemented using software, the software may be stored in a computer program product and loaded into computer system 700 using raid array 716, removable storage drive 714, hard drive 712 or communications interface 724.

In other embodiments, features of the disclosure are implemented primarily in hardware using, for example, hardware components such as Application Specific Integrated Circuits (ASICs) and programmable or static gate arrays. Implementation of a hardware state machine so as to perform the functions described herein will also be apparent to persons skilled in the relevant art(s).

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments. Further, the invention should be defined only in accordance with the following claims and their equivalents.

It is to be appreciated that the Detailed Description section, and not the Abstract section, is intended to be used to interpret the claims. The Abstract section may set forth one or more but not all exemplary embodiments of the present disclosure as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

The claims in the instant application are different than those of any parent application, child application, or other related applications. The Applicant therefore rescinds any disclaimer of claim scope made in any parent application, child application, or any predecessor application in relation to the instant application. The Examiner is therefore advised that any such previous disclaimer and the cited references that it was made to avoid, may need to be revisited. Further, the Examiner is also reminded that any disclaimer made in the instant application Should not be read into or against the parent application, child application, or related application.

What is claimed is:

1. A method to adjust a timing offset of a cable modem (CM) when waking up the CM prior to a termination of a sleep cycle of the CM, comprising:
    receiving a service identifier (SID) for a multicast maintenance region at the CM, wherein the multicast maintenance region is a transmission interval that is sized to allow the CM to adjust the timing offset after waking up prior to the termination of the sleep cycle;
    receiving a message at the CM from a cable modem termination system (CMTS) to enter the sleep cycle;
    waking up the CM prior to the termination of the sleep cycle in response to an event; and
    sending a message, during the multicast maintenance region, from the CM to the CMTS to adjust the timing offset of the CM in response to the waking.

2. The method of claim 1, wherein the CM is part of a group of CMs that share the multicast maintenance region corresponding to the SID, and wherein a second group of CMs share a second multicast maintenance region corresponding to a second SID.

3. The method of claim 1, further comprising:
    selecting the multicast maintenance region corresponding to the SID based on a priority number assigned to the CM within the SID.

4. The method of claim 1, further comprising:
    receiving, at the CM, a second SID for a unicast maintenance region, wherein the unicast maintenance region is an Interval Usage Code 4 (IUC4) maintenance region.

5. The method of claim 4, further comprising:
    using the unicast maintenance region to adjust the timing offset of the CM when the CM wakes up at the end of the sleep cycle.

6. The method of claim 1, wherein the multicast maintenance region is an Interval Usage Code 3 (IUC3) maintenance region.

7. The method of claim 1, wherein the multicast maintenance region is smaller than an initial Interval Usage Code 3 (IUC3) maintenance region used for ranging modems not previously ranged, and wherein adjusting the timing offset aligns an upstream transmission of the CM with its allocated time slot.

8. The method of claim 1, further comprising:
    powering down circuits including a clock recovery circuit during the sleep cycle.

9. The method of claim 8, further comprising:
    powering up circuits including the clock recovery circuit when waking up the CM from the sleep cycle.

10. The method of claim 1, wherein the event is one of a loss of A/C power and use of backup battery power, a Wake On LAN (WOL) event, or an interrupt, and wherein the WOL event wakes up the CM in response to receiving a message over a network.

11. A method in a cable modem termination system (CMTS) to adjust a timing offset for a cable modem (CM) waking up prior to an end of a sleep cycle of the CM, comprising:
    assigning a service identifier (SID) to the CM for a multicast maintenance region, wherein the multicast maintenance region is a transmission interval that is sized to allow the CM to adjust the timing offset after waking up prior to the termination of the sleep cycle;
    sending a message to the CM to enter the sleep cycle;
    allocating bandwidth for the multicast maintenance region; and
    receiving a ranging request during the multicast maintenance region from the CM when the CM wakes up prior to the end of the sleep cycle.

12. The method of claim 11, further comprising:
    assigning a group of CMs to the multicast maintenance region corresponding to the SID; and
    assigning a second group of CMs to a second multicast maintenance region and a corresponding second SID.

13. The method of claim 12, wherein the assigning the group of CMs further comprises:
    assigning a priority number to the CM within the SID.

14. The method of claim 11, further comprising:
    assigning a second SID to the CM for a unicast maintenance region, wherein the unicast maintenance region is an Interval Usage Code 4 (IUC4) maintenance region.

15. The method of claim 14, further comprising:
receiving a ranging request from the CM during the unicast maintenance region when the CM wakes up at the end of the sleep cycle.

16. The method of claim 11, wherein the multicast maintenance region is an Interval Usage Code 3 (IUC3) maintenance region.

17. The method of claim 11, wherein the multicast maintenance region is smaller than an initial Interval Usage Code 3 (IUC3) maintenance region used for initial ranging, and wherein adjusting the timing offset aligns an upstream transmission of the CM with its allocated time slot.

18. The method of claim 11, wherein the CMTS receives the ranging request from the CM in response to the CM waking up before the end of the sleep cycle due to an event at the CM.

19. The method of claim 18, wherein the event is one of loss of A/C power and use of backup battery power, a Wake On LAN (WOL) event, or an interrupt; and wherein the WOL event wakes up the CM in response to receiving a message over a network.

20. The method of claim 11, wherein the CMTS determines a duration of the sleep cycle.

* * * * *